United States Patent [19]

Steed

[11] 4,106,194
[45] Aug. 15, 1978

[54] CUTTING MEANS

[75] Inventor: Trevor Ashton Steed, Sydney, Australia

[73] Assignee: Harry M. Miller Attractions Pty. Limited, Kings Cross, Australia

[21] Appl. No.: 772,826

[22] Filed: Feb. 28, 1977

[30] Foreign Application Priority Data

Feb. 27, 1976 [AU] Australia .............................. 5021/76

[51] Int. Cl.² ............................................ B26B 15/00
[52] U.S. Cl. .................................................. 30/228
[58] Field of Search ........................... 30/228, 241, 180

[56] References Cited
U.S. PATENT DOCUMENTS

| 3,152,397 | 10/1964 | Adam ..................................... | 30/228 |
| 3,177,584 | 4/1965 | Cockerill ................................ | 30/228 |
| 3,995,369 | 12/1976 | Duff ...................................... | 30/228 |

Primary Examiner—Jimmy C. Peters
Attorney, Agent, or Firm—Holman & Stern

[57] ABSTRACT

A cutting means particularly for dehorning animals comprises a frame mounting a pair of opposed blades relatively movable between open and closed positions, one of said blades being operated by an hydraulic ram, a pair of handles extending in parallel array from the frame, one of the handles accommodating a rotary valve for controlling fluid flow to the ram, to actuate the movable blade, said one handle being rotatable to operate the rotary valve and the disposition of the handle being such that when only the one handle is gripped, the weight of the cutting means tends to rotate the valve to move the movable blade towards an open position.

3 Claims, 4 Drawing Figures

CUTTING MEANS

BACKGROUND OF THE INVENTION

The present invention relates to cutting means and more particularly to cutting means suitable for dehorning animals such as sheep, cattle and goats.

It is frequently necessary in modern animal husbandry to dehorn animals such as cattle for veterinary reasons or to prevent the animals from brusing one another during the yarding or transport of the animals. Traditionally cattle have been dehorned manually which method is both time consuming and very tiring for the operator.

In recent years proposals have been made for the use of hydraulically powered dehorners, e.g. U.S. Pat. Nos. 3,177,584 and 3,152,397. These proposals have, however, been unsatisfactory in that they have permitted the actuation of the dehorner without ensuring that both hands of an operator of the device are clear of the cutting blades. The present invention is designed to ensure that the risk of injury to an operator using the cutting means is reduced to a minimum.

BRIEF SUMMARY OF THE INVENTION

The present invention consists in cutting means comprising a frame; a pair of opposed blades mounted on the frame, at least one of which is movable between an open position, in which there is a space between cutting edges of the blades, and a closed position, in which substantially no such space exists; and a hydraulic or pneumatic ram mounted on the frame and adapted, when connected to a hydraulic or pneumatic power source, to effect the movement of the said movable blade or blades, the cutting means being characterised in that valve means to control the flow of hydraulic or pneumatic fluid to the ram are mounted on the cutting means and are so associated with a pair of handles mounted on the frame that the movement of the said movable blade or blades to the closed position can be effected when the user has one hand on each of the handles, when the cutting means is in its normal operating orientation.

In another aspect the present invention consists in cutting means comprising a frame; a pair of opposed blades mounted on the frame; one of the blades being movable relative to the other between an open position in which cutting edges on the blades are spaced apart and a closed position in which the said edges are juxtaposed; a hydraulic or pneumatic double acting ram mounted on the frame and adapted, when connected to a hydraulic or pneumatic power source, to effect movement of the said movable blade between the open and closed positions; and a pair of handles on the frame, one of the handles containing longitudinally extending hydraulic or pneumatic fluid inlet and outlet ducts and being rotatable within a bore in the frame to selectively direct hydraulic or pneumatic fluid from the inlet duct to the ram to either move the movable blade to or away from the closed position, the handle being so positioned relative to the frame that when only the said one handle is held by an operator the weight of the cutting means will cause it to rotate relative to the handle until the hydraulic or pneumatic fluid from the inlet duct is directed to the ram to move the movable blade to the open position.

In a particularly preferred embodiment of the invention the handles extend in a parallel spaced apart array from the frame, one of the handles being disposed on either side of the hydraulic ram. The valve means may conveniently comprise a two way rotary valve mounted within one of the handles and operated by rotating the handle about its longitudinal axis. In this embodiment of the invention the single rotary two way valve is so arranged that if both hands of an operator are not each on one of the handles the weight of the dehorner will cause the valve to be biassed towards its position which causes hydraulic fluid to flow to open the blade of the cutting means. It will be recognised that this biassed opening of the blades will only necessarily take place, and is only designed specifically to take place when the dehorner is in its normal operating orientation.

In another embodiment of the invention each of the handles may be associated with, i.e. may include or be juxtaposed to, a valve such that both valves must be activated to activate the

DETAILED DESCRIPTION OF THE INVENTION

Figure 1:
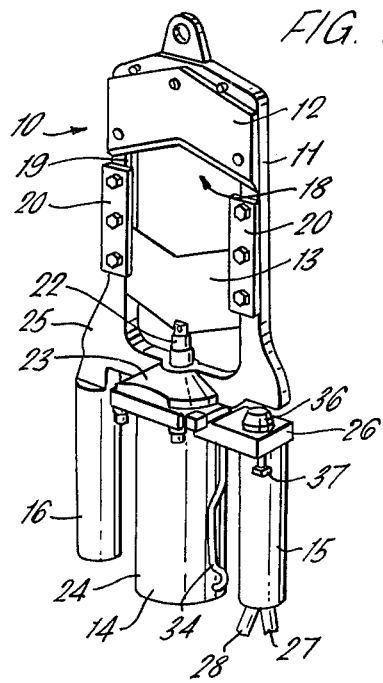
FIG. 1 is a front perspective view of a dehorner according to this invention.
Figure 4:
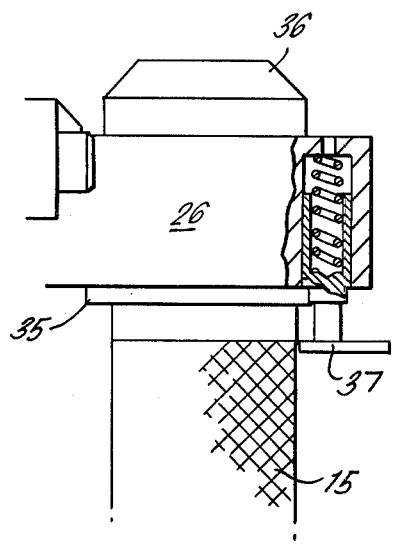
FIG. 4 is a partial section through the safety catch of the dehorner of FIG. 1.

The dehorner 10 comprises a frame 11, a fixed blade 12 bolted to the frame 11 a movable blade 13 connected to the piston rod of an hydraulic ram 14, a pair of handles 15 and 16, and a hydraulic fluid valve 17 disposed within handle 15.

The frame 11 is substantially rectangular in outline and includes a substantially rectangular aperture 18. The blade 12 is mounted across one end of the aperture 18 with its sharp edge facing towards the other end of the aperture. The blade 13 is movable along grooves 19 formed along the sides of the frame 11 bordering the sides of the aperture 18; plates 20 serve to retain the blade within the grooves 19. The blade 13 has its sharp edge facing towards blade 12 and is, at its other end, connected to the piston rod 22 of the hydraulic ram 14 having a cylinder 24 and a piston 38. The piston 22 extends through an aperture formed in a block 23 constituting one end of the frame 11.

The cylinder 24 of the hydraulic ram 14 is bolted to the block 23 of the frame and surrounds the piston rod 22. The frame 11 also carries the handle 16 which is screwed onto a projecting limg 25 of the frame 11. The handle 15 is however rotatably mounted in a block 26 which is itself bolted to the cylinder 24.

Figure 2:
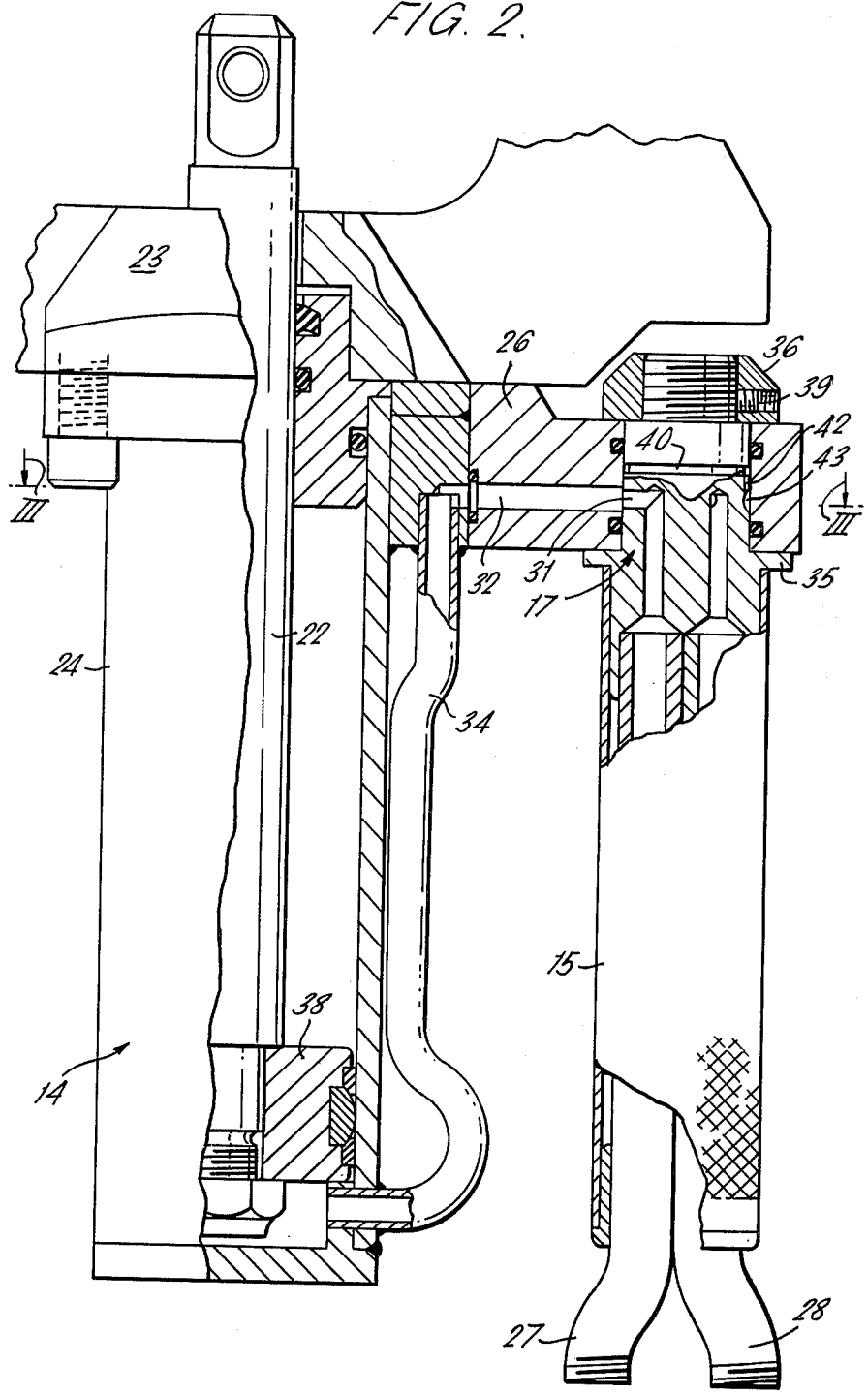
FIG. 2 is an enlarged and partly cut away view of the hydraulic ram, the valve and one handle of the dehorner of FIG. 1.

The handle 15 has as its free ends hydraulic fluid inlet and outlet ducts 27 and 28 which run through the length of the handle 15. The inlet duct 27 terminates in a radially extending duct 31 while the outlet ducts 28 terminates in a pair of radially extending ducts 29 and 30. The radial ducts 29, 30 and 31 are adapted to connect with ducts 32 and 33 in the block 26. The duct 32 connects through duct 34, with the lower end of the cylinder 24 while the duct 33 connects with the upper end of the cylinder 24. When the valve is in the position shown in FIGS. 2 and 3 hydraulic fluid flows along inlet duct 27, through radial duct 31, duct 32 and duct 34 to the lower end of the cylinder 24 below the piston 38. The piston 38 is therefore biassed upwardly as seen in FIG. 2 i.e. the blades are biassed to a closed position. In this position hydraulic fluid can flow from above the piston 38 to the outlet duct 28 through ducts 33 and 29.

Figure 3:
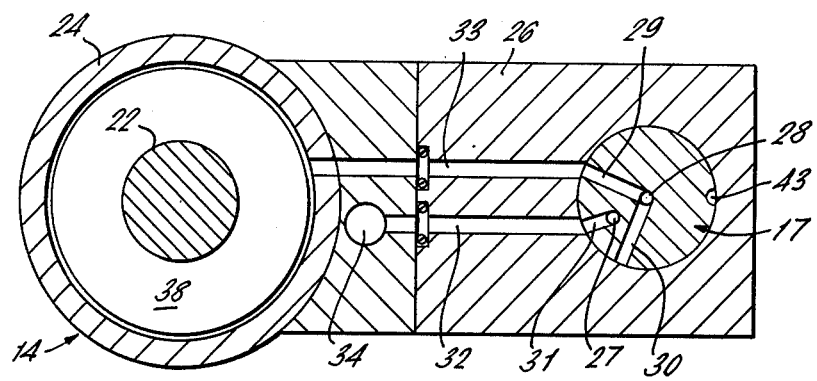
FIG. 3 is a section along III — III of FIG. 2.

If the handle 15 is rotated clockwise, as seen in FIG. 3 the radial duct 31 will be brought into juxtaposition with duct 33 and duct 30 will be brought into juxtaposition with duct 32, hydraulic fluid will then be free to flow to the upper end of the cylinder 24 above the piston 38 to cause the piston and the piston rod 22 to move downwardly and to move the blades apart; fluid from the lower side of the piston 38 will flow out through the outlet duct 28 via ducts 34, 32 and 30.

The handle 15 is retained in rotatable engagement with block 26 by a flange 35 and a nut 36, the nut 36 being screwed onto a threaded end portion of the handle 15 and retained in position by grub screw 39. The flange 35 has a pair of cut out portions around its perimeter. One of these serves to co-operate with a pin (not shown); either end of the cut out portion acts as a stop to limit the rotational movement of the handle 15. The other cut out portion serves to co-operate with a safety catch 37, the safety catch 37 having to be depressed before relative rotational movement between the handle 15 and the block 26 is possible.

In order to balance the fluid pressures on the valve 17 a circumferential groove 40 is provided about the valve 17, this groove communicates via groove 42 with a dimple 43 positioned in diametric opposition to duct 31. Hydraulic fluid which seeps from the inlet duct 27 via duct 31 into any voids between the valve 17 and block 26 will be caught in the groove 40 and thence to dimple 43. Once the pressures in duct 31 and dimple 43 are balanced binding of the valve 17 in the block 26 is reduced.

It will be appreciated that in use the handle 15 can only be rotated by a users right hands in an anti-clockwise manner, as is required to activate the dehorner, if the operators left hand is holding handle 16 and thereby preventing relative rotation of the dehorner. It follows that if both of the users hands are on the handles of the dehorner they can not inadvertantly be placed between the blades as the dehorner is being activated. It will also be noted that in the event that the user lets go of the handle 16 the weight of the dehorner 10 will cause the frame 11 to rotate in an anti-clockwise direction relative to the handle 15 held by the user, thereby automatically biassing the blades to an open position and simultaneously activating the safety catch.

I claim:

1. Cutting means comprising a frame; a pair of opposed blades mounted on the frame, at least one of which is movable between an open position, in which there is a space between cutting edges of the blades, and a closed position, in which substantially no such space exists; a hydraulic or pneumatic ram mounted on the frame and adapted, when connected to a hydraulic or pneumatic power source, to effect the movement of the said movable blade or blades, a pair of handles mounted on the frame and extending in parallel array from the frame and valve means comprising a two-way rotary valve mounted within one of the handles and operated by rotating said one handle about its longitudinal axis to control the flow of hydraulic or pneumatic fluid to the ram in a manner whereby the movement of the said movable blade or blades to the closed position can be effected when the user has one hand on each of the handles, when the cutting means is in its normal operating orientation and the direction of rotation of the handle relative to the frame required to effect movement of the movable blade or blades to the closed position being such that if only the one handle of the cutting means is held by an operator the weight of the cutting means will bias it to rotate relative to the handle in the opposite direction.

2. Cutting means comprising a frame; a pair of opposed blades mounted on the frame; one of the blades being movable relative to the other between an open position in which cutting edges on the blades are spaced apart and a closed position in which the said edges are juxtaposed; a hydraulic or pneumatic double acting ram mounted on the frame and adapted, when connected to a hydraulic or pneumatic power source, to effect movement of the said movable blade between the open and closed positions; and a pair of handles on the frame, one of the handles containing longitudinally extending hydraulic or pneumatic fluid and inlet and outlet ducts being rotatable within a bore in the frame to selectively direct hydraulic or pneumatic fluid from the inlet duct to the ram to either move the movable blade to or away from the closed position, the handle being so positioned relative to the frame that when only the said one handle is held by an operator the weight of the cutting means will cause it to rotate relative to the handle until the hydraulic or pneumatic fluid from the inlet duct is directed to the ram to move the movable blade to the open position.

3. Cutting means as claimed in claim 2 in which a safety catch is provided between the said one handle and the frame which safety catch releasably engages to prevent further relative rotational movement between the frame and the handle when the fluid from the inlet duct is directed to the ram to move the movable blade to the open position.

* * * * *